United States Patent
Masputra et al.

(10) Patent No.: US 7,400,581 B2
(45) Date of Patent: Jul. 15, 2008

(54) LOAD-BALANCING UTILIZING ONE OR MORE THREADS OF EXECUTION FOR IMPLEMENTING A PROTOCOL STACK

(75) Inventors: Cahya Adi Masputra, Millbrae, CA (US); Kacheong Poon, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 978 days.

(21) Appl. No.: 10/378,764

(22) Filed: Mar. 3, 2003

(65) Prior Publication Data

US 2004/0174877 A1 Sep. 9, 2004

(51) Int. Cl.
*G01R 31/08* (2006.01)
(52) U.S. Cl. .................. 370/230; 370/235
(58) Field of Classification Search .............. None
See application file for complete search history.

(56) References Cited

U.S. PATENT DOCUMENTS

| | | | | |
|---|---|---|---|---|
| 5,335,222 A * | 8/1994 | Kamoi et al. | ........... | 370/230 |
| 5,615,255 A * | 3/1997 | Lemieux | ........... | 379/230 |
| 6,356,951 B1 * | 3/2002 | Gentry, Jr. | ........... | 709/250 |
| 6,389,468 B1 * | 5/2002 | Muller et al. | ........... | 709/226 |
| 6,453,360 B1 * | 9/2002 | Muller et al. | ........... | 709/250 |
| 6,480,489 B1 * | 11/2002 | Muller et al. | ........... | 370/389 |
| 6,483,804 B1 * | 11/2002 | Muller et al. | ........... | 370/230 |
| 6,606,301 B1 * | 8/2003 | Muller et al. | ........... | 370/230 |
| 6,650,640 B1 * | 11/2003 | Muller et al. | ........... | 370/392 |
| 6,917,590 B1 * | 7/2005 | Oliva | ........... | 370/232 |
| 2002/0001307 A1 * | 1/2002 | Nguyen et al. | ........... | 370/386 |
| 2002/0027880 A1 * | 3/2002 | Mesiwala | ........... | 370/252 |
| 2002/0089989 A1 * | 7/2002 | Christensen et al. | ... | 370/395.42 |
| 2003/0091031 A1 * | 5/2003 | Kuhlmann et al. | ........... | 370/352 |
| 2004/0123109 A1 * | 6/2004 | Choi | ........... | 713/176 |
| 2004/0136370 A1 * | 7/2004 | Moore et al. | ........... | 370/389 |
| 2004/0139222 A1 * | 7/2004 | Slik et al. | ........... | 709/236 |
| 2005/0058149 A1 * | 3/2005 | Howe | ........... | 370/428 |
| 2005/0129044 A1 * | 6/2005 | Katayama | ........... | 370/412 |
| 2005/0201284 A1 * | 9/2005 | Cheriton | ........... | 370/232 |

* cited by examiner

*Primary Examiner*—Huy D. Vu
*Assistant Examiner*—Phuongchau B Nguyen
(74) *Attorney, Agent, or Firm*—Martine Penilla & Gencarella, LLP

(57) ABSTRACT

Embodiments of the present invention provide a novel method of implementing a network communication protocol. In one embodiment, the state of the network communication process is determined based upon one or more conditions. The protocol stack is then executed as a single thread of execution if the network communication process is in a first state. Alternatively, the protocol stack is executed as a receive thread of execution and a drainer thread of execution if the network communication process is in a second state.

29 Claims, 6 Drawing Sheets

LOAD-BALANCING UTILIZING ONE OR MORE THREADS OF EXECUTION FOR IMPLEMENTING A PROTOCOL STACK

FIELD OF THE INVENTION

Embodiments of the present invention relate to network communication methods and apparatus, and more particularly to execution thread handling for receiving data packets.

BACKGROUND OF THE INVENTION

Referring to FIG. 1, a diagram of a network device, in accordance with the conventional art, is shown. As depicted in FIG. 1, the network device 110 (e.g. computer, workstation, server, or the like) comprises one or more interface modules 120, one or more protocol stacks 130, and one or more applications 140. The interface module 120 provides for receipt of data packets 150 transmitted on a communication channel 160. The protocol stack 130 provides for processing of the data packets 150 destined for the application 140. The application 140 (e.g. database systems, text editors, games, and the like) provides users with various functions.

Each data packet 150 is comprised of a header 170 and a payload 180. The interface module 120 acquires each data packet 150 and stores it in a buffer. The interface module 120 generates an interrupt upon acquiring a data packet 150. An operating system of the network device 110 catches the interrupt and spins off a thread of execution to handle the interrupt. The thread of execution represents one or more sequences of instructions (e.g., code) comprising the applicable protocol stack (e.g. DLPI, IP protocol, TCP protocol, and/or the like). The interrupt therefore causes the protocol stack 130 to receive the data packet and provide for routing and flow control. The thread then delivers the payload 180 of the data packet 150 to the destination application 140 in accordance with information contained in the header 170.

The protocol stack 130 provides a network communication protocol, such as the transmission control protocol/internet protocol (TCP/IP) suite, or the like. The TCP/IP protocol suite is typically divided into three layers: transport layer, internet layer, and network access layer. The transport layer (TCP) provides a flow control protocol. The flow control protocol keeps track of data packets to assure reliable delivery to an intended destination application. It includes explicit and acknowledged connection initiation and termination, reliable in-order unduplicated delivery of data, and out of band indication of urgent data. The internet layer (IP) provides an addressing and routing protocol. The addressing and routing protocol includes host-to-host addressing and routing of data packets, data packet fragmentation, and re-assembly. The network access layer provides a receive protocol, such as data link provider interface (DLPI), or the like. The receive protocol provides access to and transmission of data across a communication channel 160.

According to the conventional art, the thread of execution spans the receive stream, from the interface module 120 to the application 140. The single thread of execution provides the payload 180 to the application 140 as quickly as possible. Thus, according to the conventional art, the single thread of execution provides for short data latency when receiving data packets 150. However, while the thread is being executed the protocol stack 130 cannot service another data packet 150. Therefore, the interface module 120 buffers other incoming data packets 150 until the protocol stack 130 can service another data packet 150. The interface module 120, however, has a finite buffer for holding data packets 150. Therefore, if the data packets 150 are received faster then the protocol stack 130 can process them, the interface module 120 will drop data packets 150 once its buffer is full.

Thus, the network device 110 is prone to reduced throughput when the data packet traffic speed exceeds the speed at which the network device 110 can process incoming data packets. Hence, there is a continued need for a network communication method capable of providing for increased network throughput.

SUMMARY OF THE INVENTION

Embodiments of the present invention provide for improved network throughput. Embodiments of the present invention provide an interrupt thread comprising a single thread of execution for receiving and processing packets according to an applicable protocol. Embodiments of the present invention also provide an interrupt thread comprising a receive thread for receiving data packets and a drainer thread for processing packets according to the applicable protocol.

Embodiments of the present invention selectively execute a network communication stack as a single thread of execution or as a plurality of threads. The protocol stack may be executed as a single thread upon detection of one or more conditions. The protocol stack may be executed as a receive thread and a drainer thread upon detection of one or more other conditions.

Embodiments of the present invention provide a communication protocol comprising a network layer, a internet layer, and a transport layer. The transport layer realizes a computerized procedure for determining when control or receipt of data packets should be transferred from a single thread of execution, to a combination of a receive thread of execution and a drainer thread of execution.

Embodiments of the present invention provide for reliable receipt of data packets by a network device. Embodiments of the present invention also advantageously increase processing of data packets by the network interface card and protocol stack. Embodiments of the present invention also provide a flexible and protocol-independent method for receiving data packets. Accordingly, embodiments of the present invention avoid fundamental changes to processing data packets, and minimize potential impact on network device stability and performance.

Embodiments of the present invention only require minimal and localized changes to the protocol stack. Embodiments of the present invention, furthermore, maintain compliance with current networking standards. Embodiments of the present invention are backward compatible with device drivers and other protocols or technologies (e.g. IPsec, IPQoS, CGTP, and the like). Furthermore, applications benefit from the increase in network throughput and reduced processor utilization provided by embodiments of the present invention. Increased data latency, resulting from the hand-off between the receive thread and the drainer thread, is only incurred when system and/or traffic loads are sufficiently high that throughput is increased.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
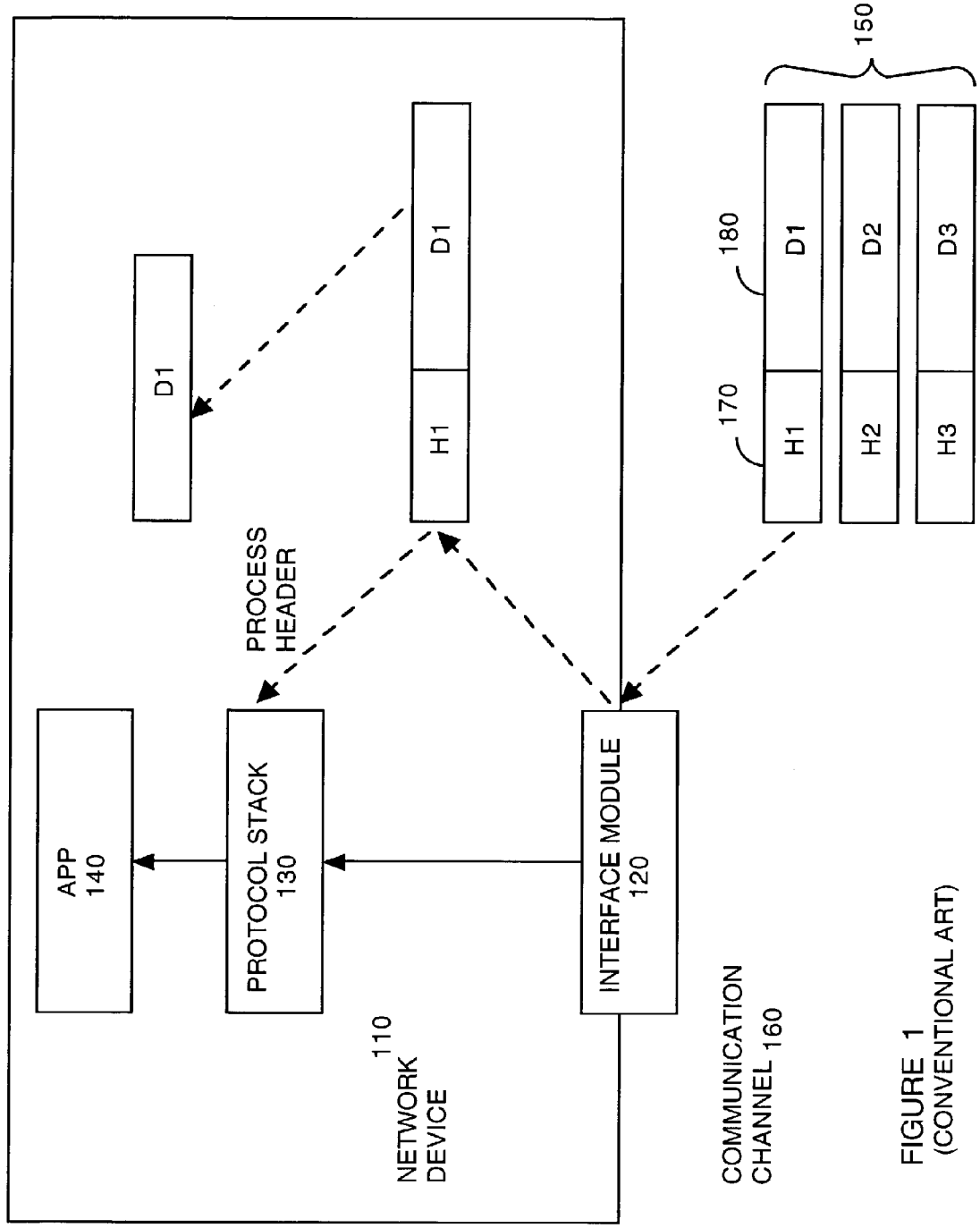
FIG. 1 shows a diagram of a network device, according to the conventional art.

Referring again to FIG. 1, the protocol stack 130, according to the conventional art, is executed by a single thread of execution. According to one embodiment of the present invention, the protocol stack 130 may be executed as a first thread of execution when the network device 110 is in a first state. Alternatively, the protocol stack 130 may be executed as a plurality of threads of execution, when the network device 110 is in a second state. The state of the network device 110 may be determined by one or more conditions. The conditions may comprise a system load, a trend of the system load, a data packet traffic type, a trend of the traffic type, and/or the like.

Figure 2:
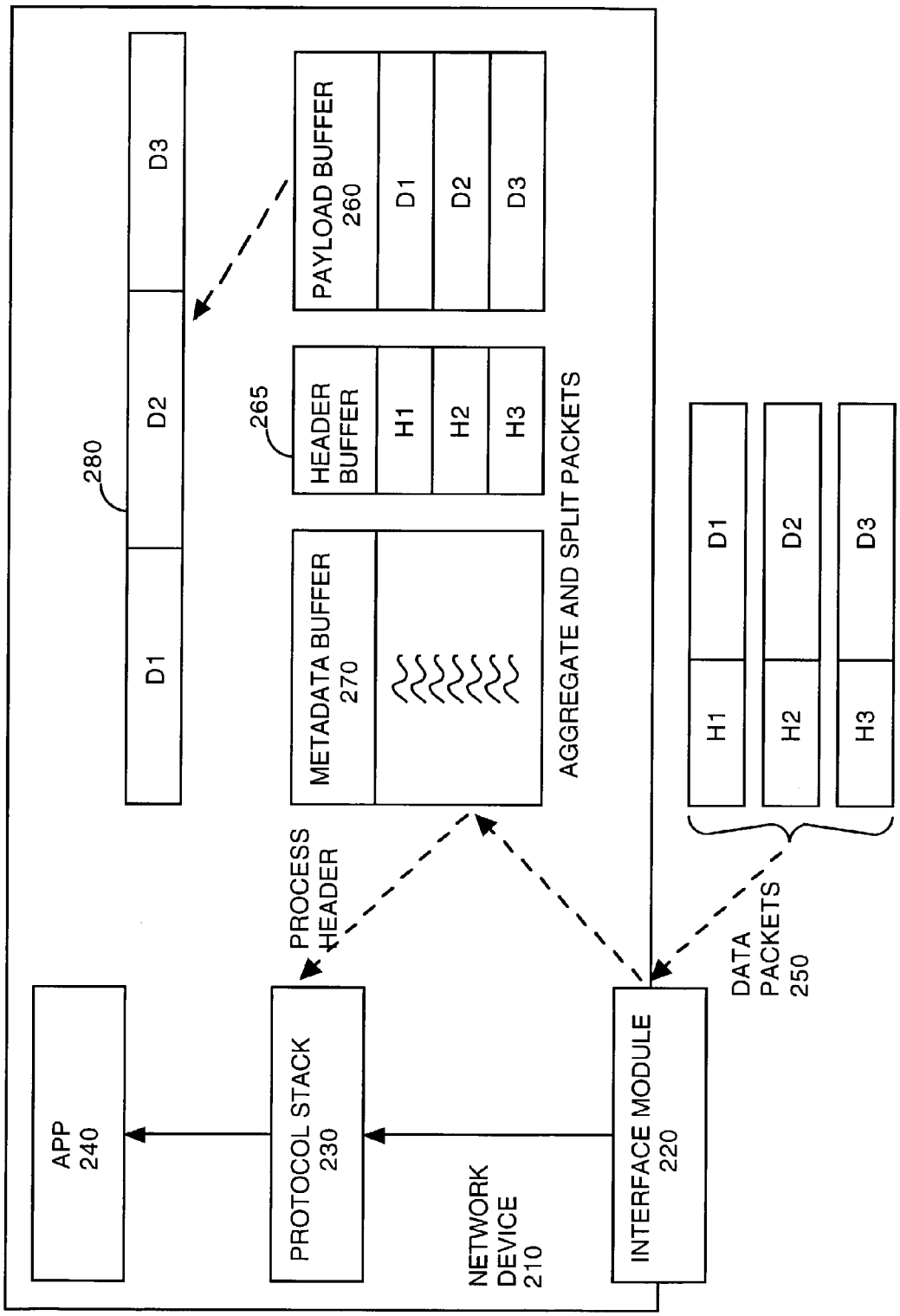
FIG. 2 shows a diagram of a network device for implementing embodiments of the present invention.

Referring now to FIG. 2, a diagram of a network device, in accordance with Inventors' co-pending U.S. patent applications entitled "Multi-Data Receive Processing According to a Data Communication Protocol" and "Data Communication Execution Thread," is shown. To the extent not repeated herein, the contents of "Multi-Data Receive Processing According to a Data Communication Protocol" (Ser. No. 10/254,699, filed Sep. 24, 2002, inventors Poon et. al.) and "Data Communication Execution Thread" (Ser. No. 10/254,174, filed Sep. 24, 2002, inventors Poon et. al.), both assigned to the assignee of the present invention, are incorporated herein by reference. As depicted in FIG. 2, the network device 210 comprises one or more interface modules 220, one or more protocol stacks 230 and one or more applications 240.

The interface module 220 acquires data packets 250 and generates an interrupt. The operating system of the network device 210 catches the interrupt and spins off a thread of execution to handle the interrupt. The thread of execution represents a code stack comprising an applicable protocol suite (e.g. DLPI, IP protocol, TCP protocol, and/or the like). The given protocol suite provides for receipt, routing, flow control, and the like, of one or more data packets.

The receive portion of the protocol stack 230 provides for receipt of a plurality of data packets 250. Data packets 250 destined for the same application 240 are aggregated to provide multi-data receipt. In one implementation, the received portion of the protocol stack 230 waits for a predefined condition, when aggregating multiple data packets 250 destined for the same application 240. The predefined condition is selected so as to increase network throughput and provide for efficient processor utilization.

In one configuration, the predefined condition may be a specified maximum number of data packets 250. In an exemplary configuration, the maximum number of data packets 250 is selected from a range of 2-10 packets. In another configuration, the predefined condition may be an interval of time chosen such that the sending network device does not re-send one or more of the data packets 250 because an acknowledgement has not been receive. In another configuration, the predefined condition may be an interval of time chosen such that latency is not unduly increased. Furthermore, if a data packet is received for another application, the aggregation of the previous data packets 250 may be terminated.

When multiple data packets 250 for the same application 240 are received, the receive portion of the protocol stack 230 also implements header/payload splitting. Splitting data packets 250 causes the payload of each packet to be loaded into a payload buffer 260, the header of each packet to be loaded into a header buffer 265, and information about the aggregation and splitting to be loaded into a metadata buffer 270. The metadata buffer 270 may contain information such as a pointer to the start of the header buffer and payload buffer, the number of packet elements, the location and length of each packet element, and the like, for the aggregated data packets 250.

In one implementation, the receive portion of the protocol stack 230 loads the header and payload into the respective buffers 260, 265 in the order that the data packets 250 are received. In another implementation, the data packets 250 are reordered according to the sequence number in the header of each packet, before loading the header and payload into the respective buffers 260, 265. The protocol stack 230 also provides routing and flow control functions, utilizing the aggregated header buffer 265 and metadata buffer 270.

In one implementation, the protocol stack 230 then passes a payload pointer to the destination application 240. When the protocol stack 230 reorders the data packets 250 according to the sequence number in the header of each packet, the payload buffer 260 logically represents a contiguous payload. In another implementation, the protocol stack 230 copies the payloads from the payload buffer 260 into an application buffer 280, according to the sequence number in the corresponding header. The application buffer 280 therefore contains a contiguous payload.

According to the present embodiment, the protocol stack 230 may be executed as a first thread of execution when the network device is in a first state. Alternatively, the received portion of the protocol stack 230 may be executed as a receive thread of execution, when the network device is in a second state. The flow control portion of the protocol stack 230 is then executed as a drainer thread of execution, when the network device is in the second state. Furthermore in one implementation, the routing portion of the protocol stack 230 may be executed by the receive thread of execution. In another implementation, the routing portion of the protocol stack 230 may be executed by the drainer thread of execution.

The state of the network device may be determined by one or more conditions. The conditions may comprise a system load, a trend of the system load, a data packet traffic type, a trend of the traffic type, and/or the like.

Figure 3:
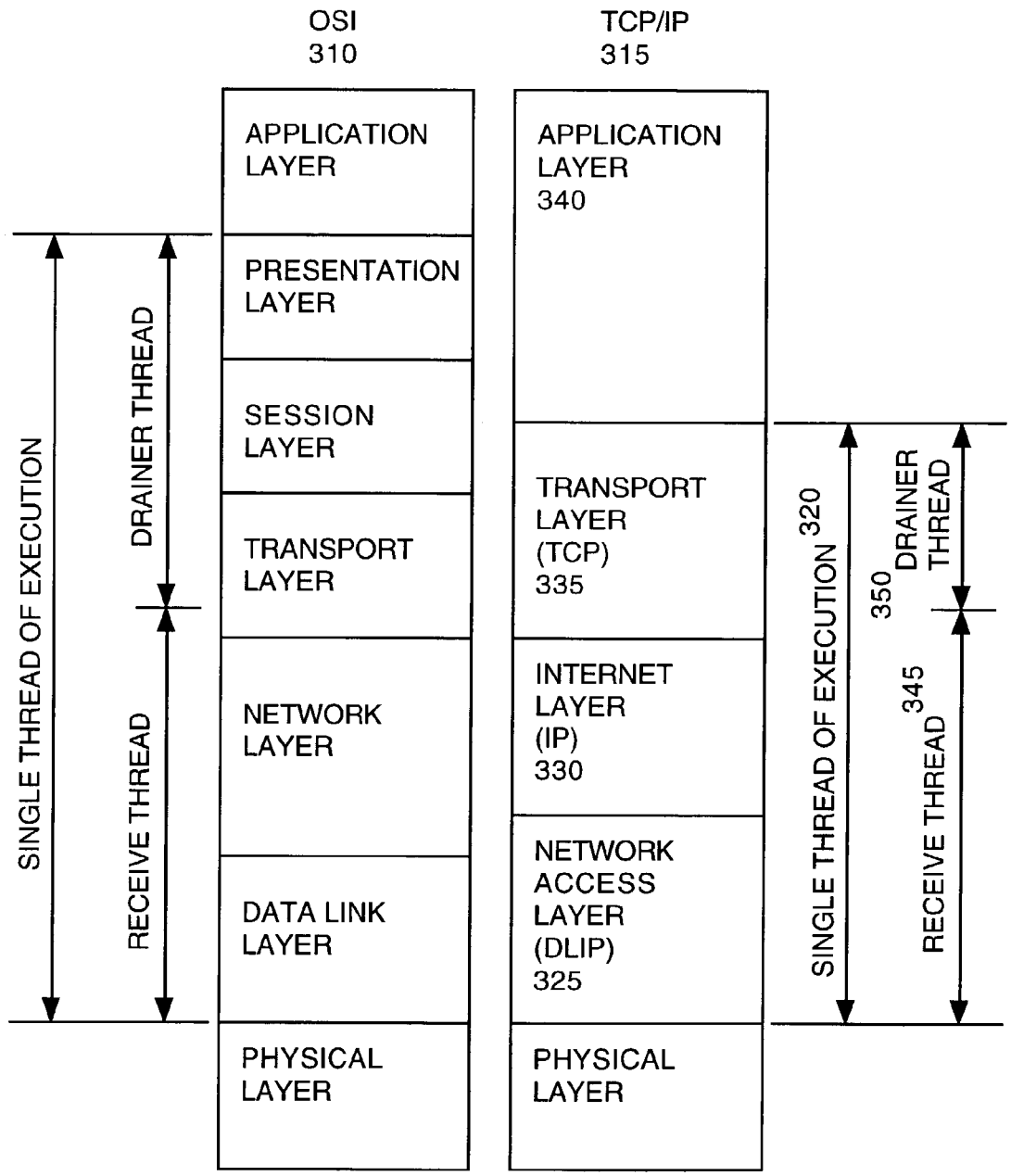
FIG. 3 shows a block diagram of various protocol architectures for implementing embodiments of the present invention.

Referring now to FIG. 3, a block diagram of various protocol architectures, for implementing embodiments of the present invention, are shown. As depicted in FIG. 3, embodiments of the present invention may be realized utilizing an open system interconnect (OSI) 315, a transmission control protocol/internet protocol (TCP/IP) 310, or the like architecture.

In an exemplary embodiment, the protocol architecture may be the TCP/IP protocol stack 310, which comprises a network access layer 325 providing for receipt of one or more packets. The TCP/IP protocol stack 310 further comprises an internet (IP) layer 330 providing for routing of the one or more packets. The TCP/IP protocol stack 310 further comprises a transport (TCP) layer 335 providing for flow control of the one or more packets. The protocol stack 310 may be performed as a single thread of execution 320, or as a receive thread 345 and a drainer thread 350.

In one implementation, the internet layer 330 determines if the protocol stack 310 is performed as a single thread of execution 320, or as a received thread 345 and a drainer thread 350. In another implementation, the transport layer 335 determines if the protocol stack 310 is performed as a single thread of execution 320, or as a receive thread 345 and a drainer thread 350.

In an exemplary embodiment, if the system load is low and/or the packet type is urgent, the single thread of execution 320 may be utilized. The single thread of execution 320 provides for implementing the network access layer 325, the internet layer 330, and the transport layer 335 of the TCP/IP 310 protocol. The single thread of execution 320 provides for minimal data latency. However, additional data packets cannot be received by the network access layer 325 while the current data packet is being processed by the single thread of execution 320. Thus, the single thread of execution 320 is advantageous for receiving and processing data packets during periods of low system load and/or for urgent type data packet traffic.

If the system load is high and/or the packet type is not urgent, the receive thread 345 and drainer thread 350 may be utilized. In one implementation, the receive thread 345 provides for implementing the network access layer 325 and the internet layer 330. The drainer thread 350 provides for implementing the transport layer 335. In another implementation, the receive thread 345 provides for implementation of the network access layer 325. The drainer thread 350 provides for implementing the internet layer 330 and transport layer 335.

The receive thread 345 provides for receipt of an additional data packet, while the drainer thread 350 is processing the current packet. Thus, the network access layer 325 can advantageously process additional packets. The increased packet handling capacity of the network access layer 325 reduces the chance that data packets will be dropped during periods of high data packet traffic and/or high system load. As a result, the increased packet handling capacity increases system throughput, which offsets the data latency resulting from the multiple threads 345, 350.

Figure 4:
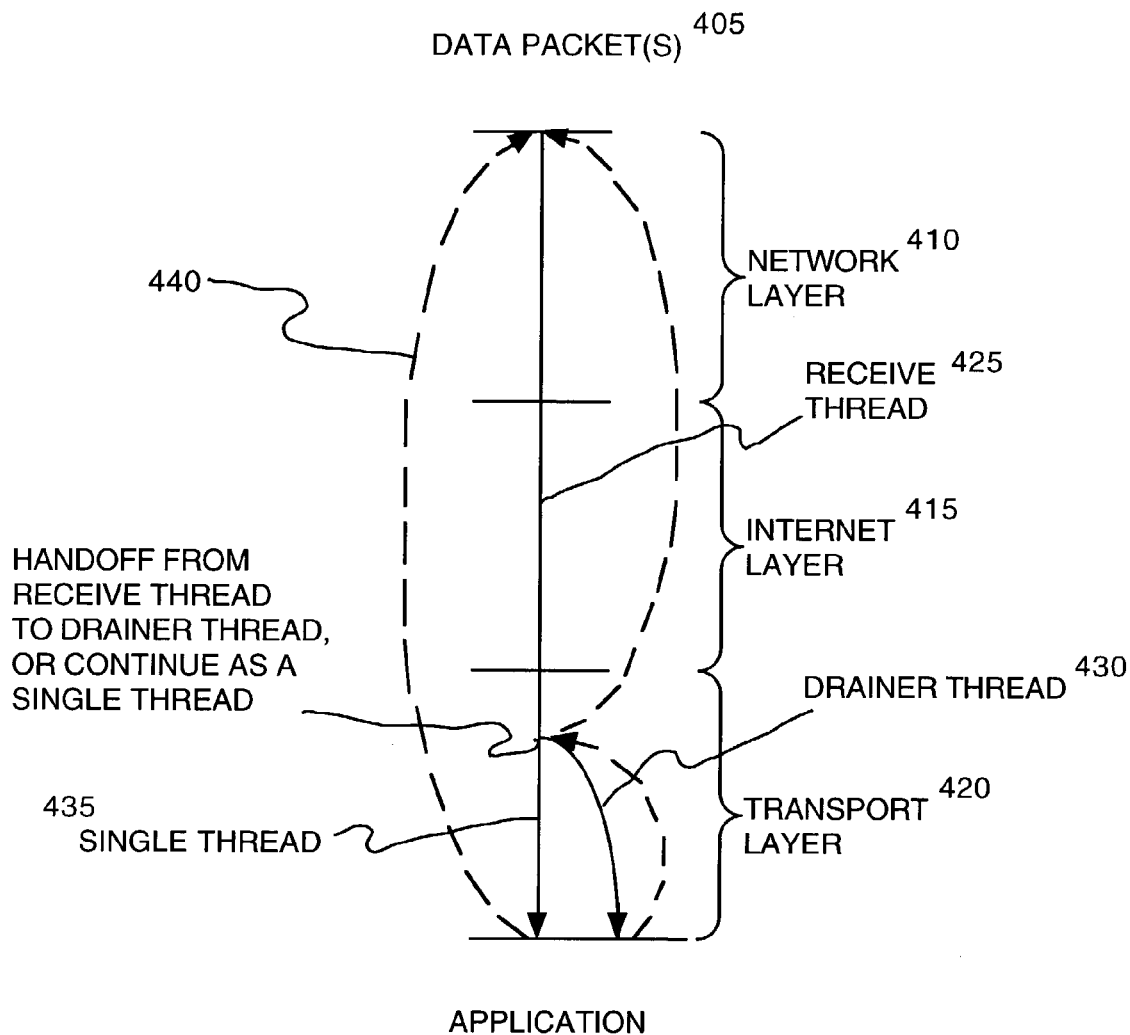
FIG. 4 shows a flow diagram of a computer implemented receive process in accordance with one embodiment of the present invention.

Referring now to FIG. 4, a flow diagram of a computer implemented receive process in accordance with one embodiment of the present invention is shown. As depicted in FIG. 4, the process begins with receipt of one or more data packets 405 by a network layer 410. In an exemplary embodiment, one or more headers of the one or more data packets 405 are then processed at the internet layer 415. The internet layer 415 provides for routing of the received data packets 405.

The one or more headers of the one or more data packets 405 are also processed at the transport layer 420. The transport layer 420 determines whether the balance of the protocol stack is executed as a single thread of execution 435, or as a received thread 425 and a drainer thread 430. If the initial execution of the protocol stack is abbreviated, with the balanced of the protocol stack executed as a drainer thread, the initial portion effectively becomes the receive thread 425. The transport layer 420 also provides for flow control of the received data packets 405.

Processing data packets utilizing a single thread of execution 435 provides for minimal data latency. Thus, data packet such as urgent traffic can be processed without the added latency introduced by a plurality of execution threads 425, 430. In addition, the single thread of execution 435 may advantageously be utilized when the system load is relatively low. When the system load is relatively low, there is a low probability that data packets will be dropped before the single thread of execution 435 is completed and returned 440 to the network layer 410 to handle a new data packet.

Processing data packets utilizing a plurality of threads of execution 425, 430 results in increased latency. However, the process for receiving a new packet of data can be executed again by the receive thread 425, while the drainer thread 430 is handling the current data packet. When the data packet traffic and/or system load is sufficiently high, the network interface buffer may overflow resulting in additional data packets being dropped. Dropping packets reduces network throughput, which nullifies any reduced data latency provided by a single thread of execution 435. Thus, increased system performance may be achieved by trading increased data latency for faster receive processing of incoming data packets.

The present embodiment may also be utilized when the protocol stack provides for multi-data receive processing. The aggregating of data packets and header/payload splitting may be performed by the protocol stack prior to determining whether to continue processing as a single thread of execution 435, or handing-off from a receive thread 425 to a drainer thread 430. The single thread of execution or the combination of the receive thread and drainer thread then processes the aggregated headers in order to provide for reliable delivery of the aggregated payloads to a corresponding destination application.

Figure 5:
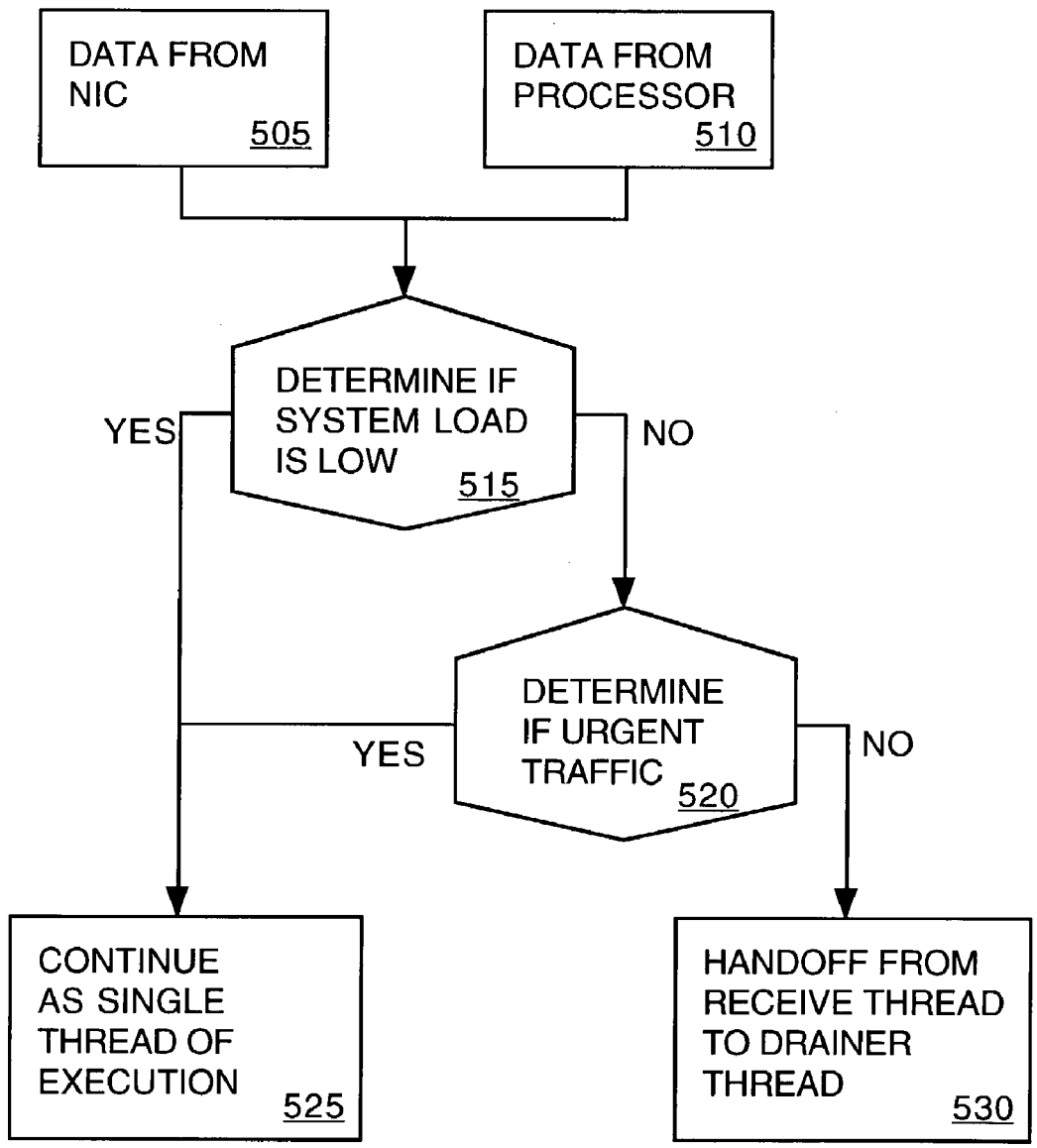
FIG. 5 shows a flow diagram of a computer implemented load balancing process utilized in a network communication protocol, in accordance with one embodiment of the present invention.

Referring now to FIG. 5, a flow diagram of a computer implemented load balancing process utilized in a network communication protocol, in accordance with one embodiment of the present invention, is shown. As depicted in FIG. 5, the protocol receives information from various sources 505, 510 and determines whether execution of a protocol stack should continue as a single thread of execution 525 or whether to handed-off from a receive thread to a drainer thread 530.

In an exemplary embodiment, a transport layer of the protocol stack receives data from a network interface card (NIC) concerning the data packet traffic 505. The transport layer of the protocol stack also receives data from a processor, an operating system, or a destination application concerning the system load 510. If the system load is low 515, or the trend of the system load indicates that it will soon become low, the receipt of data packets may be handled by a single thread of execution 525. Furthermore, if the data packets are of an urgent type of data traffic 520, the receipt of data packets may be handled by a single thread of execution 525 even if the system load is high 515.

If the system load is high 515, the trend of the system load indicates that it will soon become high, and/or the data packets are of a non-urgent type of data traffic, the receipt of data packets may be handed-off from a receive thread to a drainer thread 530. If the load is relatively high, the interrupt thread starts with a receive thread and then passes to a drainer thread 530.

Figure 6:
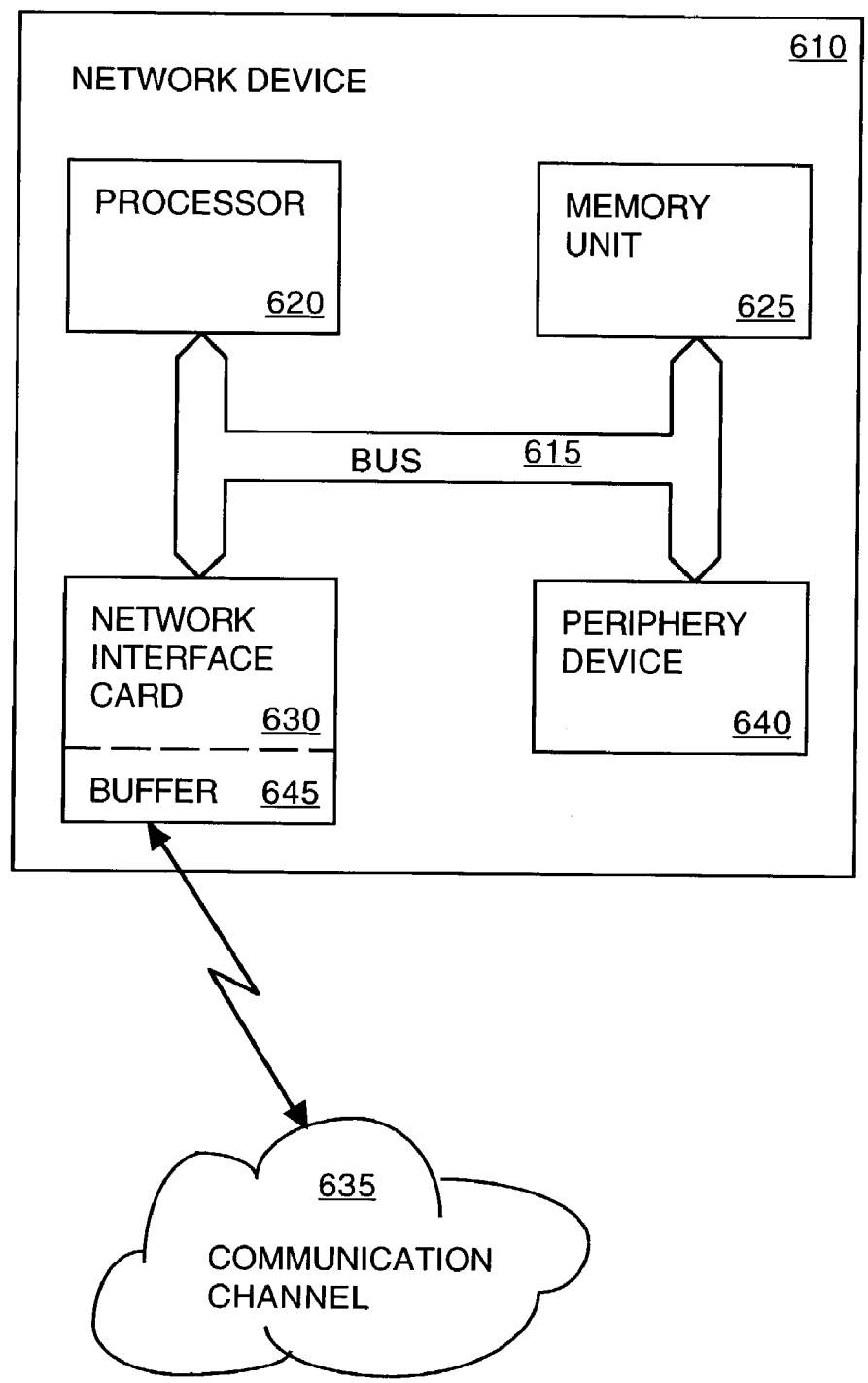
FIG. 6 shows a block diagram of an exemplary network device for implementing embodiments of the present invention.

Referring now to FIG. 6, a block diagram of an exemplary network device 610 for implementing embodiments of the present invention is shown. As depicted in FIG. 6, the network device 610 comprises an address/data bus 615 for communicating information and instructions. One or more processors 620 are coupled with the bus 615 for processing information and instructions. A memory unit 625 is also coupled to the bus 615 for storing information and instructions for the processor(s) 620. The memory unit 625 may include volatile memory (e.g. random access memory, static RAM, dynamic RAM, and the like), non-volatile memory (e.g. read only memory, programmable ROM, flash memory, EPROM, EEPROM, and the like), mass data storage (e.g. hard disk, optical disk, floppy disk, and the like), and the like. Optionally, the network device 610 may include peripheral devices 640 (e.g. display, keyboard, pointing device, speaker, and the like) coupled to the bus 615.

The network device 610 also includes one or more network interface cards (NIC) 630 coupled to the bus 615. The NIC 630 provides for communicating with other network devices across a communication channel 635.

Certain processes and steps of the present invention are realized as a series of instructions (e.g. code) that reside on a computer-readable medium such as the memory unit 625, and are executed by the processor 620. When executed, the instructions cause the processor 620 to provide an operating system, one or more applications, one or more communication protocols, and the like.

In an exemplary embodiment, there may be an instance of a transmission control protocol (TCP) for each application. In an exemplary embodiment, the TCP protocol provides for flow control of data packets. For each instance of the TCP protocol, there is an instance of an internet protocol (IP) protocol. The IP protocol provides for addressing and routing of data packets.

There are also one or more instances of a data link protocol interface (DLPI) for one or more instances of the IP protocol. The DLPI protocol may be provided by firmware in the NIC 630, and/or the processor 620 operating on instructions and information contained in the memory unit 625. The DLPI protocol provides for receipt of data packets from the communication channel 635.

Incoming data packets are buffered 645 by the NIC 630, for receive processing by the DLPI. When an incoming data packet is buffered 645 by the NIC 635, an interrupt is sent to the processor 620. The operating system therefore allocates and dispatches a thread of execution to provide the receive function of the DLPI and the routing function of the IP protocol.

Thereafter, the transport layer of the TCP protocol determines the system load being experienced by the processor. For example, the system load can be determined based upon the length of the payload queue at the transport layer. If the queue length exceeds a selected length, such information may be indicative of a high system load. The transport layer may also determine the traffic being experienced by the NIC 630. For example, the NIC 630 may indicate how many packets have been dropped. If the NIC is dropping packets, such information may be indicative of a high traffic rate.

Based upon such conditions, the transport layer determines whether to continue processing the current data packet utilizing a single thread of execution, or to hand-off processing to a drainer thread. If the transport layer determines that flow control should be executed utilizing a single thread of execution, processing latency is minimized.

If the transport layer determines that flow control should be executed utilizing a drainer thread of execution, the thread of execution effectively comprising the receive thread of execution is returned to the DLPI to handle receipt of another data packet. The increased data handling capacity of the NIC 630 therefore reduces the chance that data packets will be dropped because the NIC 630 buffer 645 is full. Hence, system throughput is increased at the expense of increased processing latency for the current data packet.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A network device comprising:
   a interface module communicatively coupled to a communication network to receive a data packet;
   a computer-readable medium to store information and instructions;
   a processor to implement a protocol stack by executing said information and instructions, the protocol stack to provide functions including,
      splitting said data packet into a payload, a header, and a metadata information;
      determining a load based on at least one of a system load, a trend of said system load, a traffic type, and a trend of said traffic type;
      processing said data packet by a single thread of execution when the load is determined to be within a capacity of the single thread of execution to handle.
      processing said data packet by a receive thread of execution and a drainer thread of execution when the load is determined to be outside of the capacity of the single thread of execution to handle; and
   an application wherein the payload of said data packet is utilized.

2. The network device according to claim 1, wherein said protocol stack further includes,
   a payload buffer to store the payload;
   a header buffer to store the header; and
   a metadata buffer to store the metadata information.

3. The network device according to claim 1, wherein said interface module comprises a network interface card.

4. The network device according to claim 1, wherein said protocol stack comprises a transmission control protocol/internet protocol (TCP/IP).

5. The network device according to claim 1, wherein said single thread of execution comprises:
   a network layer;
   an internet layer; and
   a transport layer.

6. The network device according to claim 1, wherein said receive thread of execution comprises a network layer.

7. The network device according to claim 1, wherein said drainer thread of execution comprises a transport layer.

8. A method of performing network communication comprising:
- buffering a plurality of data packets, the buffering includes splitting each of the plurality of data packets in into a payload, a header, and a metadata information;
- determining a suitable type of execution thread for processing a load wherein the load is measured based on at least one of a system load, a trend of said system load, a traffic type, and a trend of said traffic type,
- wherein the determining includes,
  - processing said plurality of data packets according to a protocol utilizing a single thread of execution when the single thread can handle the load; and
  - processing said plurality of data packets according to a protocol utilizing a receive thread of execution and a drainer thread of execution when the single thread cannot handle the load.

9. The method according to claim 8, wherein the single thread is utilized during a low system load.

10. The method according to claim 8, wherein said traffic type comprises an urgent data packet type.

11. The method according to claim 8, wherein the receive thread and drainer thread are utilized during a high system load.

12. The method according to claim 8, wherein said single thread of execution comprises:
- receiving one of said plurality of data packets;
- processing a header of said one of said plurality of data packets; and
- delivering a payload of said one of said plurality of data packets to an application according to said header.

13. The method according to claim 8, wherein said receive thread of execution comprises receiving one of said plurality of data packet.

14. The method according to claim 13, wherein said drainer thread of execution comprises:
- processing a header of said one of said plurality of data packets; and
- delivering a payload of said one of said plurality of data packets to an application according to said header.

15. The method according to claim 8, wherein said single thread of execution comprises:
- aggregating one or more of said plurality of data packets destined for an application;
- splitting said aggregated one or more of said plurality of data packets to form an aggregated headers and an aggregated payloads;
- processing said aggregated headers; and
- delivering said aggregated payloads to said application according to said aggregated headers.

16. The method according to claim 8, wherein said receive thread of execution comprises:
- aggregating one or more of said plurality of data packets destined for an application; and
- splitting said aggregated one or more of said plurality of data packets to form an aggregated headers and an aggregated payloads.

17. The method according to claim 16, wherein said drainer thread of execution comprises:
- processing said aggregated headers; and
- delivering said aggregated payloads to said application according to sad aggregated headers.

18. A method of implementing a network communication protocol stack comprising:
- determining a suitable type of execution thread for processing a load wherein the load is measured based on at least one of a system load, a trend of said system load, a traffic type, and a trend of said traffic type,
- wherein the determining includes,
  - executing a single thread of execution in a low system load;
  - executing a receive thread of execution and a drainer thread of execution in a high system load,
- wherein said single thread of execution including,
  - receiving a plurality of data packets;
  - aggregating said plurality of data packets;
  - splitting said aggregated data packets into an aggregate header and an aggregate payload;
  - creating metadata concerning said aggregate header and said aggregate payload;
  - routing said aggregate payload utilizing said aggregate header and said metadata;
  - controlling flow of said aggregate payload utilizing said aggregate header and said metadata; and
  - delivering said aggregate payload to a destination application according to said aggregate header and said metadata.

19. A method of implementing a network communication protocol stack comprising:
- determining a suitable type of execution thread for processing a load wherein the load is measured based on at least one of a system load, a trend of said system load, a traffic type, and a trend of said traffic type,
- wherein the determining includes,
  - executing a single thread of execution in a low system load;
  - executing a receive thread of execution and a drainer thread of execution in a high system load,
- wherein said receive thread of execution including,
  - receiving a plurality of data packets;
  - aggregating said plurality of data packets;
  - splitting said aggregated data packets into an aggregate header and an aggregate payload; and
  - creating metadata concerning said aggregate header and said aggregate payload.

20. The method according to claim 19, wherein said drainer thread of execution comprises:
- controlling flow of said aggregate payload utilizing said aggregate header and said metadata; and
- delivering said aggregate payload to a destination application according to said aggregate header and said metadata.

21. A computer-readable medium having program instructions which when executed by a network device implement a protocol stack coupled to an interface module to receive a data packet from a communication network and cause the network device to perform operations:
- receiving the data packet from the communication network coupled to the protocol stack through the interface module;
- spitting the data packet into a payload, a header, and a metadata information;
- buffering the payload into a payload buffer;
- buffering the header into a header buffer;
- buffering the metadata information into a metadata buffer;
- determining suitable type of execution thread for processing a load wherein the load is measured based on at least one of a system load, a trend of said system load, a traffic type, and a trend of said traffic type, wherein the determining includes, processing a first and second portion of a header of said data packet utilizing a first thread of execution in a low system load, processing said first portion of said header of said packet utilizing a second thread of execution and handing-off processing of said second portion of said header to a third thread of execution in a high system load; and delivering the payload to a destination application.

22. The computer-readable medium according to claim 21, wherein said first thread of execution comprises a single thread of execution.

23. The computer-readable medium claim 22, wherein said single thread of execution comprises an internet protocol and a transmission control protocol.

24. The computer-readable medium according to claim 21, wherein said second thread of execution comprises a receive thread of execution.

25. The computer-readable medium according to claim 24, wherein said third thread of execution comprises a drainer thread of execution.

26. The computer-readable medium according to claim 25, wherein said receive thread of execution comprises an internet protocol.

27. The computer-readable medium according to claim 26, wherein said drainer thread of execution comprises a transmission control protocol.

28. The computer-readable medium according to claim 27, wherein said internet protocol performs said determining said state of said network device.

29. The computer-readable medium according to claim 27, wherein said transmission control protocol performs said determining said state of said network device.

* * * * *